United States Patent
Zimmerman et al.

(10) Patent No.: US 9,354,837 B2
(45) Date of Patent: May 31, 2016

(54) METHODS AND APPARATUS FOR INTERFACING A HOST DEVICE TO A PERIPHERAL DEVICE IN ORDER TO INCREASE CONSUMPTION OF CONSUMABLE PRODUCTS BY THE PERIPHERAL DEVICE

(71) Applicant: Marvell World Trade Ltd., St. Michael (BB)

(72) Inventors: Gary D. Zimmerman, Garden Valley, ID (US); J. Daren Bledsoe, Albany, OR (US); Lyman Leonard Hall, Nampa, ID (US); Mark D. Montierth, Meridian, ID (US); Greg L. Allen, Boise, ID (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/935,104

(22) Filed: Jul. 3, 2013

(65) Prior Publication Data

US 2015/0012675 A1 Jan. 8, 2015

Related U.S. Application Data

(60) Provisional application No. 61/668,959, filed on Jul. 6, 2012.

(51) Int. Cl.
*G06F 5/00* (2006.01)
*G06F 3/12* (2006.01)

(52) U.S. Cl.
CPC .................................. *G06F 3/1293* (2013.01)

(58) Field of Classification Search
None
See application file for complete search history.

(56) References Cited

U.S. PATENT DOCUMENTS

| | | | |
|---|---|---|---|
| 6,311,165 B1 | 10/2001 | Coutts et al. | |
| 6,976,105 B1 | 12/2005 | Wright | |
| 7,970,817 B2 * | 6/2011 | Hagiuda et al. | 709/203 |
| 2001/0043357 A1 | 11/2001 | Owa et al. | |
| 2003/0067624 A1 * | 4/2003 | Anderson et al. | 358/1.15 |
| 2004/0190042 A1 | 9/2004 | Ferlitsch et al. | |
| 2006/0179144 A1 | 8/2006 | Nagase | |
| 2007/0030517 A1 * | 2/2007 | Narayanan | 358/1.15 |
| 2007/0124436 A1 * | 5/2007 | Shepherd | 709/223 |
| 2007/0229884 A1 | 10/2007 | Tanaka | |

(Continued)

FOREIGN PATENT DOCUMENTS

WO    WO2009137762    11/2009

OTHER PUBLICATIONS

HP, HP printer supplies & accessories sale, Mar. 12, 2005, pp. 1-13.*

(Continued)

*Primary Examiner* — Henry Tsai
*Assistant Examiner* — Dean Phan

(57) ABSTRACT

Some of the embodiments of the present disclosure provide a method comprising providing an apparatus, wherein the apparatus is configured to be coupled to (i) a peripheral device and (ii) a host device. The apparatus includes memory configured to store logic, wherein the logic is configured to (i) allow the host device and the peripheral device to communicate with each other and (ii) operate the peripheral device. The apparatus further includes a processor configured to execute the logic. The method further comprises bundling the apparatus with a consumable product for sale with the consumable product, wherein the consumable product is configured to be consumed by the peripheral device.

9 Claims, 3 Drawing Sheets

(56) References Cited

U.S. PATENT DOCUMENTS

| | | |
|---|---|---|
| 2008/0005262 A1 | 1/2008 | Wurzburg et al. |
| 2008/0039007 A1 | 2/2008 | Wu et al. |
| 2009/0002730 A1 | 1/2009 | Yamada et al. |
| 2009/0043905 A1 | 2/2009 | Aoki et al. |
| 2011/0261391 A1 | 10/2011 | Oba et al. |
| 2012/0074217 A1 | 3/2012 | Block et al. |
| 2012/0102241 A1 | 4/2012 | Tamura |
| 2012/0185306 A1 | 7/2012 | Cheng |
| 2012/0239572 A1 | 9/2012 | Wolfs et al. |
| 2013/0046197 A1 | 2/2013 | Dlugos, Jr. et al. |
| 2013/0163014 A1 | 6/2013 | Xiao |
| 2013/0332641 A1 | 12/2013 | Selkirk et al. |
| 2014/0335790 A1 | 11/2014 | Dees et al. |

OTHER PUBLICATIONS www.widipedia.com/Universal Serial Bus, Universal Serial Bus, Jan. 2005, pp. 1-7.*

The PCT Search Report and Written Opinion mailed Sep. 5, 2013 for PCT Application No. PCT/US13/49440, 9 pages.

\* cited by examiner

METHODS AND APPARATUS FOR INTERFACING A HOST DEVICE TO A PERIPHERAL DEVICE IN ORDER TO INCREASE CONSUMPTION OF CONSUMABLE PRODUCTS BY THE PERIPHERAL DEVICE

CROSS REFERENCE TO RELATED APPLICATIONS

This claims priority to U.S. Provisional Patent Application No. 61/668,959, filed on Jul. 6, 2012, which is incorporated herein by reference.

TECHNICAL FIELD

Embodiments of the present disclosure relate to use of peripheral devices with host computing devices and more particularly, to encouraging increased use of older printing devices with more recent computing devices in order to increase consumption of consumable products by the older printing devices.

BACKGROUND

An original equipment manufacturer (or OEM) generally purchases, for use in its own products, one or more components that are typically manufactured by another company. For example, original equipment manufacturers of printers (e.g., multi-function printers including print, scan, and/or fax capabilities) may incorporate various components from several other companies in creating final products for sale to customers. Original equipment manufacturers of printers generally have a very large base of installed customers—i.e., consumers who are currently using printers that have been previously purchased by the consumers. These installed customers often have older model printers that may not have as many features or as much functionality as the newer model printers being currently offered by the printer OEMs. For example, older model printers may not include newer features or technologies such as wireless capabilities, mobile printing, "Cloud" access, etc. As a result, installed customers with older model printers generally do not print as often and thus, their printers generally consume less consumable products, e.g., ink, toner, paper, etc. This results in lower revenues being generated by printer OEMs as printer OEMs tend to generate a significant portion of revenues due to the consumption of such consumable products. Additionally, many of the installed customers that have older model printers may not purchase a newer model printer because such customers may be currently content with the existing capabilities of the older model printers.

SUMMARY

In various embodiments, the present disclosure provides a method comprising providing an apparatus, wherein the apparatus is configured to be coupled to (i) a peripheral device and (ii) a host device. The apparatus includes memory configured to store logic, wherein the logic is configured to (i) allow the host device and the peripheral device to communicate with each other and (ii) operate the peripheral device. The apparatus further includes a processor configured to execute the logic. The method further comprises bundling the apparatus with a consumable product for sale with the consumable product, wherein the consumable product is configured to be consumed by the peripheral device.

In various embodiments, the present disclosure provides a combination of items comprising an apparatus, wherein the apparatus is configured to be coupled to (i) a peripheral device and (ii) a host device. The apparatus also includes memory configured to store logic, wherein the logic is configured to (i) allow the host device and the peripheral device to communicate with each other and (ii) operate the peripheral device. The apparatus further includes a processor configured to execute the logic. The combination of items further comprises a consumable product, wherein the consumable product is configured to be consumed by the peripheral device.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure.

DETAILED DESCRIPTION

Figure 1:
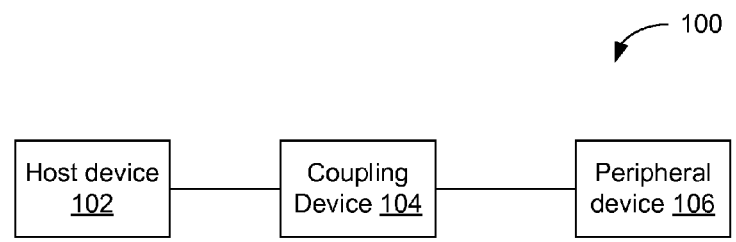
FIG. 1 schematically illustrates a host device coupled to a peripheral device via a coupling device.

FIG. 1 illustrates an arrangement 100 that includes a host device 102, a coupling device 104, and a peripheral device 112. The host device 102 generally is a computing device that includes computing capabilities. Such computing devices include, for example, desktop computers, tower computers, laptop computers, notebook computers, tablet computers, personal digital assistants (PDAs), and mobile phones. This list of possible computing devices is provided merely as an example and is not meant to be limiting. The peripheral device 106 is a device for use with a computing device. Such peripheral devices include, for example, printing devices, scanning devices, and multi-function printing devices that are capable of printing, scanning, faxing, and other functions. The peripheral device 106 may be another type of device and the list provided is merely for example and not meant to be limiting. For clarity and ease of understanding, the host device 102 will be referred to herein as the computing device 102 and the peripheral device 106 will be referred to herein as the printing device 106.

The coupling device 104 couples the computing device 102 and the printing device 106. The coupling is at least a communicative coupling, but can also be a physical coupling. Thus, the coupling device 104 provides a communication conduit between the computing device 102 and the printing device 106.

Figure 2:
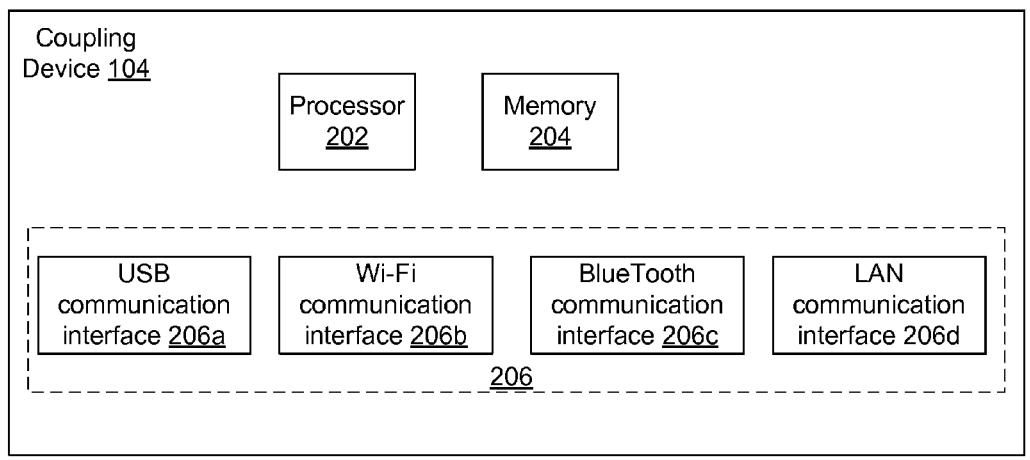
FIG. 2 schematically illustrates an example of the coupling device of FIG. 1.

Referring to FIG. 2, the coupling device 104 generally includes a processor 202, a memory 204, and one or more interfaces 206. The processor 202 can be in the form of one or more processors, multi-processing cores, etc., that can be configured as a system on chip (SOC). More particularly, the processor 202 can be configured as a printer SOC. The memory 204 can include various types of memory such as, for example, random access memory (RAM), flash memory, etc.

The interfaces 206 can include multiple types of communication interfaces such as, for example, a Universal Serial Bus (USB) communication interface 206a, a Wi-Fi communication interface 206b, a Bluetooth communication interface 206c, and/or a local access network (LAN) communication interface 206d. The list of communication interfaces is merely an example of the possibilities and is not meant to be limiting.

The coupling device 104 can be coupled to the printing device 106 via a wireless connection or a wired connection, via one of the interfaces 206. Likewise, the coupling device 104 can be coupled to the computing device 106 via a wireless connection or a wired connection, via one of the interfaces 206.

For older printing devices, there may be a very limited number of ways for a device to couple to and communicate with the older printing devices. In general, most older printing devices need to be physically coupled to a host computing device via a wired connection. Thus, the coupling device 104 can be physically coupled to the printing device 106 via a cable (not illustrated) extending from the coupling device 104 to the printing device 106. The cable (not illustrated) can include a USB type plug that may be plugged into a USB port of the printing device 106. Other types of physical connections may be utilized depending upon the type of ports included on the printing device 106 and the interfaces 206 included with the coupling device 104. Furthermore, if the printing device 106 includes wireless capabilities, then the coupling device 104 can be coupled to the printing device 106 via a wireless connection, depending upon the interfaces 206 included with the coupling device 104. In various embodiments, the coupling device 106 can be physically attached and wired directly to the printing device 106 such that the printing device 106 and the coupling device 104 are a single, integrated unit, i.e. the coupling device 104 is part of the printing device 106.

Depending upon the connection capabilities of the computing device 102, the computing device 102 can be coupled to the coupling device 104 via various types of connections through one of the interfaces 206 of the coupling device 104. For example, depending upon the interfaces 206 included with the coupling device 104, the computing device 102 can be coupled to the coupling device 104 via a USB connection, a Wi-Fi connection, a Bluetooth connection, a LAN connection, etc. Thus, the computing device 102 can be coupled to the coupling device 104 via either a wired connection (an appropriate cable between the coupling apparatus 104 and the computing device 102) or a wireless connection.

Accordingly, the coupling device 104 may include one or more cables (not illustrated) permanently coupled to the coupling device 104. The one or more cables are each configured with an appropriate connector, i.e. USB plugs, to be used to couple the coupling device 104 to the printing device 106 and/or the computing device 102. The coupling device 104 may also include one or more input/output (I/O) ports (not illustrated) to allow for detachable cables (not illustrated) configured with appropriate connectors, e.g., USB plugs, to be used to couple the coupling device 104 to the printing device 106 and/or the computing device 102. The various types of interfaces, cables and/or I/O ports allow for a variety of connection options via the coupling device 104 between the printing device 106 and the computing device 102.

Figure 3:
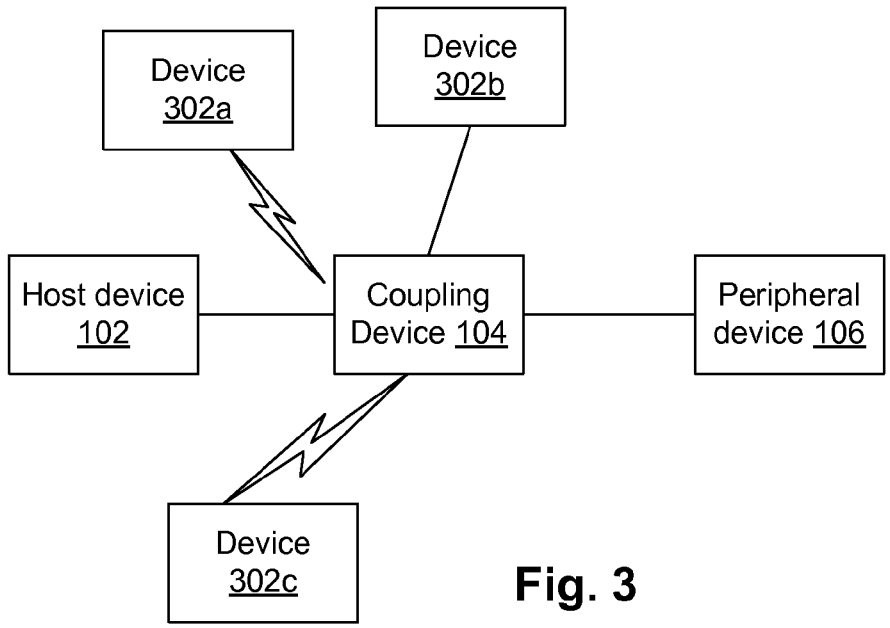
FIG. 3 schematically illustrates a plurality of host devices coupled to the peripheral device via the coupling device.

The coupling device 104 includes logic in the form of software and/or firmware, stored in the memory 204, configured to provide functionality to the printing device 106 and, depending upon the application, the computing device 102. For example, logic can be included in the coupling device 104 that, as previously described, provides the ability for various types of connections via interfaces 206 of the coupling device 104 between the printing device 106 and the computing device 102. For example, if the printing device 106 does not have wireless capabilities, a wireless access interface can be included with the coupling device 104, as well as the appropriate software and/or firmware. The coupling device 104 can be coupled to the printing device 106 via a wired connection and the coupling device 104 can communicate with the computing device 102 via the wireless access interface. Thus, the computing device 102 can interact with the printing device 106 wirelessly. For example, the interfaces 206 of the coupling device 104 can include wireless access interfaces such as, for example, a Bluetooth interface, a Wi-Fi/Wi-Fi-direct interface, etc., along with the appropriate logic in memory 204. Additionally, as can be seen in FIG. 3, multiple computing devices 302a, 302b, 302c, can also interact with the printing device 106 via wireless connections with the coupling device 104 due to the presence of the wireless access interfaces. Thus, a user's other computing devices, such as, for example, a laptop computer, a notebook computer, a tablet computer, a personal digital assistant (PDA), and a mobile phone, etc. could be used to interact with the printing device 106 via the coupling device 104 via a wireless connection. Thus, the coupling device 102 adds wireless capabilities to the printing device 106 that allow for a variety of other computing devices to interact with the printing device 106.

If the coupling device 104 includes a LAN interface and corresponding logic included within memory 204, the computing device 102 and the printing device 104 can communicate with other devices included within the LAN via the coupling device 104. Likewise, the other devices included within the LAN can communicate with the computing device 102 and the printing device 104 via the coupling device 104. Thus, the coupling device 104 can add LAN connectivity to the printing device 106 for a local access networks for multiple computing devices if desired.

Additionally, logic in the form of software and/or firmware can be included within memory 204 of the coupling device 104 to enable automatic printing via the printing device 106. For example, the logic can be included to cause the coupling device 104 to automatically access and retrieve documents from various locations within a network such as, for example, the Internet, the Cloud, a wireless service, etc. Logic can be further included on the coupling device 104 to convert retrieved documents so that they can be printed by the printing device 106. Such automatic retrieval and printing of jobs can be scheduled directly by the logic included on the coupling device 104 to automatically retrieve content from the network, convert the content for printing, and print the content.

Software and firmware for the coupling device 104 can be automatically upgraded based upon access to various networks by the coupling device 104. Likewise, software for the coupling device 104 can be automatically installed on the coupling device 104 based upon access to various networks by the coupling device 104. Accordingly, software such as, for example, drivers related to the printing device 106 for various computing devices, can be automatically installed onto the coupling device 104. Likewise, software for various other types of computing devices, such as, for example, PDAs and mobile phones, etc., can be auto-installed onto the coupling device 104. The software for the various computing devices installed on the coupling device 104 allows the coupling device 104 to receive a print job from a particular computing device, convert the print job to the appropriate format for the printing device 106 and forward the print job to the printing device 106 for printing. Thus, the coupling device acts as a pass-through device that allows for communication between the printing device 106 and a variety of computing devices 102.

Power can be provided for the coupling device 104 via a USB connection with the printing device 106. Additionally, if the coupling device 104 is directly coupled, i.e., wired, to the printing device 106, then power can also be received from the printing device 106. Additionally, a separate AC power connection can be provided for the coupling device 104. Large capacitors (not illustrated), often referred to as "super CAPs," can also be included within the coupling device 104 to store power received from the USB connection to be used in the future in place of or in conjunction with power received from the USB connection to help ensure that ample power is provided for the coupling device 104.

Use of a coupling device 104 with an older type printing device 106 can provide greater functionality and use of the printing device 106 for a user of the printing device 106. Thus, the coupling device 104 generally serves as a print controller. Thus, use of the printing device 106 will increase and therefore, use of consumable products, such as, for example, ink, toner, paper, etc., will also increase. The increase in use of consumable products will thereby lead to larger sales and revenues for OEMs of such older printing devices 106.

Figure 4:
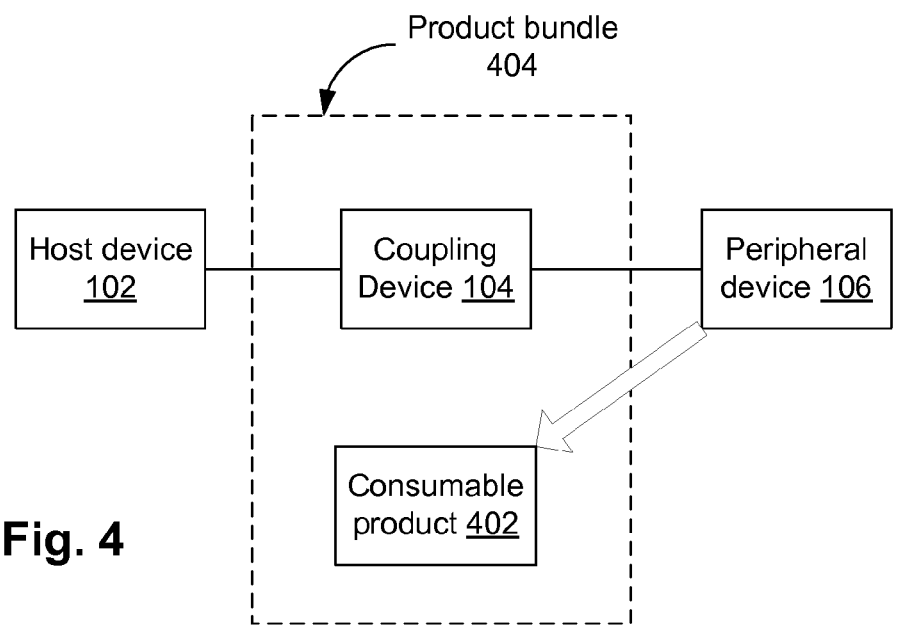
FIG. 4 schematically illustrates an arrangement of a product bundle that includes the coupling device and a consumable product that is consumed by the peripheral device.

Referring to FIG. 4, as incentive to increase the consumption of such consumable products, OEMs may include a coupling device 104 with packages of consumable products. For example, an OEM may bundle a coupling device 104 with consumable product 402, such as, for example, a package of ink cartridges, to create a product bundle 404. In order to induce the use of the older printing device, the OEM may include the coupling device 104 for free in the product bundle 404 with the consumable product 402. Alternatively, the OEM may increase the cost of the consumable product 402 slightly to help offset the cost of the coupling device 104. Also, the OEM could sell the coupling device 104 outright to users of older printing devices 102, or even simply give the coupling device 104 to users of older printing devices 102 for free. Based upon the low cost of the components within the coupling device 104, any of these scenarios may lead to the coupling devices 104 being provided to users of older printing devices 106 easily and efficiently.

Thus, an owner of a printing device 106 purchases a product bundle 408 that includes a consumable product 402 and the coupling device 104. The user couples the coupling device 104 to a computing device 102 and to a printing device 106. As previously described herein, the various new features and functionality that the coupling device 104 provides to the user for the printing device 106 makes it easier for the user to use the printing device 106 in a variety of new ways, thereby increasing the consumption of consumable products 402.

Figure 5:
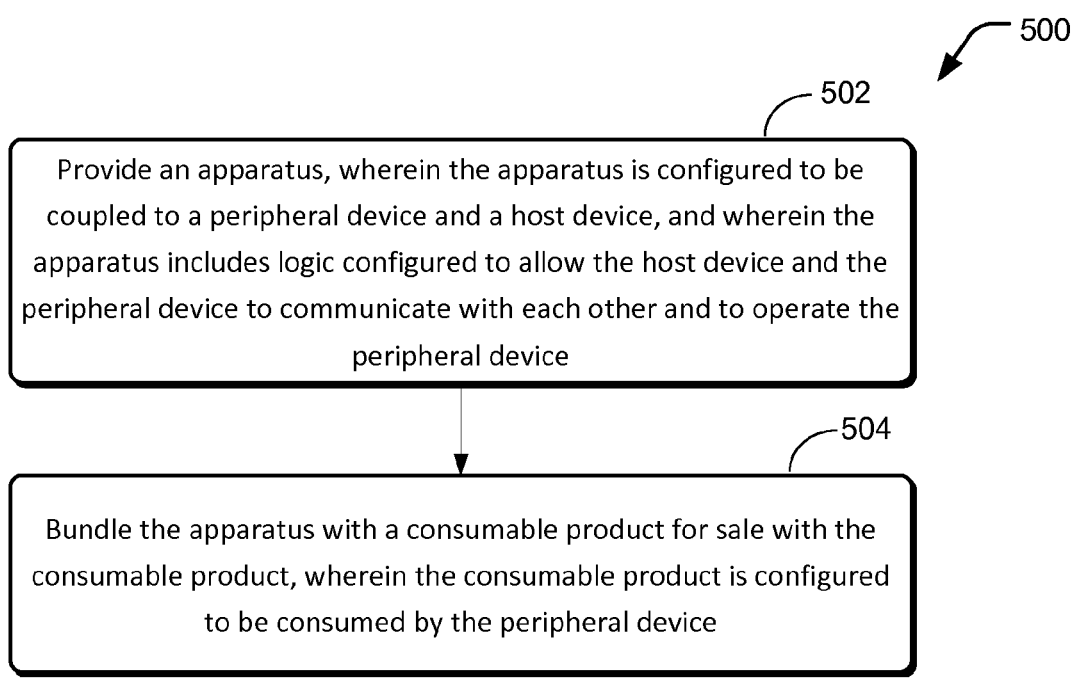
FIG. 5 is a flow diagram illustrating an example method of increasing use of consumable products by users of peripheral devices.

FIG. 5 is a flow diagram illustrating an example method 500 of increasing use of consumable products by users of peripheral devices. At 502, an apparatus is provided. The apparatus is configured to be coupled to (i) a peripheral device and (ii) a host device. The apparatus includes memory configured to store logic, wherein the logic is configured to (i) allow the host device and the peripheral device to communicate with each other and (ii) operate the peripheral device. The apparatus further includes a processor configured to execute the logic. At 504, the apparatus is bundled with a consumable product for sale with the consumable product, wherein the consumable product is configured to be consumed by the peripheral device.

In accordance with various embodiments, an article of manufacture may be provided that includes a storage medium having instructions stored thereon that, if executed, result in the operations described herein with respect to certain aspects of the method 500 (and/or various other operations discussed herein). In an embodiment, the storage medium comprises some type of non-transitory memory, such as memory 204. In accordance with various embodiments, the article of manufacture may be a computer-readable medium such as, for example, software or firmware.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:

facilitating, by a coupling device, communication between a host device and a peripheral device, wherein the communication between the host device and the peripheral device is via the coupling device, wherein the coupling device is separate from each of the host device and the peripheral device, and wherein a cable is permanently coupled to the coupling device such that (i) a first end of the cable is permanently attached to one or more internal components of the coupling device and (ii) a second end of the cable comprises a Universal Serial Bus (USB) connection plug that is configured to be inserted in a USB interface of the peripheral device;

receiving, by the coupling device, power from the peripheral device via the USB connection plug and the cable, wherein the received power is used to operate the coupling device;

receiving, by the coupling device, a print command from the host device via a first USB link, wherein the print command to the coupling device does not include a document for printing, and wherein the first USB link is different and separate from the USB connection plug and the cable;

in response to receiving the print command, receiving, by the coupling device, the document from a server over the Internet, wherein the server is different from the host device; and transmitting, by the coupling device, the contents of the retrieved document to the peripheral device for printing.

2. The method of claim 1, wherein the peripheral device is a printing device, and the host device is a computing device.

3. The method of claim 1, wherein the host device is a first host device, and wherein the method further comprises:
   facilitating, by the coupling device, communication between each of a plurality of host devices and the peripheral device, wherein the plurality of host devices includes the first host device.

4. The method of claim 1, wherein the host device comprises a desktop computer, a tower computer, a laptop computer, a notebook computer, a tablet computer, a personal digital assistant, or a mobile phone.

5. A coupling device comprising:
   a cable, wherein (i) a first end of the cable is permanently attached to one or more internal components of the coupling device and (ii) a second end of the cable comprises a Universal Serial Bus (USB) connection plug that is configured to be inserted in a first USB interface of a peripheral device; and
   a second USB interface configured to receive a first end of a USB link, wherein a second end of the USB link is configured to be coupled to a host device,
   wherein the coupling device is configured to facilitate communication between the host device and the peripheral device,
   wherein the communication between the host device and the peripheral device is via the coupling device,
   wherein the coupling device is separate from each of the host device and the peripheral device,
   wherein the coupling device is configured to receive power from the peripheral device via the USB connection plug and the cable,
   wherein the received power is used to operate the coupling device, and
   wherein the coupling device is configured to (i) receive a print command from the host device via the USB link and the second USB interface, the print command to the coupling device not including a document to be printed, (ii) receive the document from a server over the Internet, the server being different from the host device, and (iii) transmit the contents of the retrieved document to the peripheral device for printing.

6. The coupling device of claim 5, wherein the peripheral device is a printing device.

7. The coupling device of claim 5, wherein the host device is a computing device.

8. The coupling device of claim 5, wherein the host device is a first host device, and wherein the coupling device further comprises:
   a wireless communication interface configured to (i) wirelessly communicate with a second host device, and (ii) facilitate communication between the second host device and the peripheral device.

9. The coupling device of claim 5, wherein the host device comprises a desktop computer, a tower computer, a laptop computer, a notebook computer, a tablet computer, a personal digital assistant, or a mobile phone.

* * * * *